(12) United States Patent
Harris

(10) Patent No.: US 7,716,238 B2
(45) Date of Patent: May 11, 2010

(54) SYSTEMS AND METHODS FOR SERVER MANAGEMENT

(75) Inventor: Adam Pierce Harris, Foster City, CA (US)

(73) Assignee: Sony Computer Entertainment America Inc., Foster City, CA (US)

(*) Notice: Subject to any disclaimer, the term of this patent is extended or adjusted under 35 U.S.C. 154(b) by 258 days.

(21) Appl. No.: 11/367,174

(22) Filed: Mar. 3, 2006

(65) Prior Publication Data

US 2007/0198528 A1 Aug. 23, 2007

Related U.S. Application Data

(63) Continuation of application No. 11/355,327, filed on Feb. 15, 2006.

(51) Int. Cl.
*G06F 7/00* (2006.01)
(52) U.S. Cl. .................. 707/770; 707/694; 707/716; 707/792; 707/966
(58) Field of Classification Search .............. 707/3, 707/102, 103 X, 1, 2, 104.1; 719/313
See application file for complete search history.

(56) References Cited

U.S. PATENT DOCUMENTS

| | | | | |
|---|---|---|---|---|
| 5,187,787 A | * | 2/1993 | Skeen et al. | 719/314 |
| 5,339,392 A | * | 8/1994 | Risberg et al. | 715/762 |
| 5,504,894 A | * | 4/1996 | Ferguson et al. | 707/2 |
| 5,778,187 A | * | 7/1998 | Monteiro et al. | 709/231 |
| 5,864,854 A | * | 1/1999 | Boyle | 707/10 |
| 5,867,494 A | * | 2/1999 | Krishnaswamy et al. | 370/352 |
| 6,003,030 A | | 12/1999 | Kenner et al. | |
| 6,108,703 A | | 8/2000 | Leighton et al. | |
| 6,157,955 A | * | 12/2000 | Narad et al. | 709/228 |
| 6,199,110 B1 | | 3/2001 | Rizvi et al. | |

(Continued)

FOREIGN PATENT DOCUMENTS

WO WO 98/49620 11/1998

OTHER PUBLICATIONS

"How Network Load Balancing Technology Works," Microsoft TechNet, Mar. 28, 2003, 2007 Microsoft Corporation, http://technet2.microsoft.com/windowsserver/en/library/1611cae3-5865-4897-a186-7....

*Primary Examiner*—Etienne P LeRoux
*Assistant Examiner*—Bruce A Witzenburg
(74) *Attorney, Agent, or Firm*—Carr & Ferrell LLP

(57) ABSTRACT

Exemplary systems and methods for server management are provided. An exemplary system comprises a plurality of servers, with each server having the ability to access a database or, in some embodiments, be configured to perform a calculation, computation or make a determination of a particular value, values or other information. A communications network delivers queries to each server whereby a look-up table directs query processing by the servers. Further embodiments of the system feature a program logic controller for rebalancing the workload of the network servers. Exemplary methods of processing queries on the system comprise submitting a query to the network, communicating the query to each server in the network and each server looking-up on a look-up table the processing responsibilities of the servers in the network. The query is processed by the server having primary responsibility for processing the query while other the servers monitor query processing. Transmission of a query result to a user typically completes the process.

24 Claims, 9 Drawing Sheets

U.S. PATENT DOCUMENTS

| | | | |
|---|---|---|---|
| 6,212,521 B1 * | 4/2001 | Minami et al. | 707/10 |
| 6,263,433 B1 * | 7/2001 | Robinson et al. | 713/100 |
| 6,421,726 B1 | 7/2002 | Kenner et al. | |
| 6,502,125 B1 | 12/2002 | Kenner et al. | |
| 6,553,413 B1 | 4/2003 | Leighton et al. | |
| 6,564,336 B1 * | 5/2003 | Majkowski | 714/4 |
| 6,625,152 B1 * | 9/2003 | Monsen et al. | 370/392 |
| 6,665,706 B2 | 12/2003 | Kenner et al. | |

* cited by examiner

| SERVER | DATABASE SEGMENTS INSTALLED IN SERVER | SERVER PRIMARY RESPONSIBILITY DATA SEGMENTS | ALLOCATED PRIMARY QUERY RESPONSE TIME (MILLISECONDS) | DESIRED REDUNDANCY LEVEL | SERVER SECONDARY RESPONSIBILITY DATA SEGMENTS | SECONDARY QUERY INITIATION TIME (MILLISECONDS) | SERVER TERTIARY RESPONSIBILITY DATA SEGMENTS | TERTIARY QUERY INITIATION TIME (MILLISECONDS) |
|---|---|---|---|---|---|---|---|---|
| 208 | 1-6 | 1 | 100 | DOUBLE | 6 | 101 | 5 | 201 |
| 210 | 1-6 | 2 | 100 | DOUBLE | 1 | 101 | 6 | 201 |
| 212 | 1-6 | 3 | 100 | DOUBLE | 2 | 101 | 1 | 201 |
| 214 | 1-6 | 4 | 100 | DOUBLE | 3 | 101 | 2 | 201 |
| 216 | 1-6 | 5 | 100 | DOUBLE | 4 | 101 | 3 | 201 |
| 218 | 1-6 | 6 | 100 | DOUBLE | 5 | 101 | 4 | 201 |
| 310 | 320 | 330 | 340 | 350 | 360 | 370 | 380 | 390 |

FIG. 3

| SERVER | DATABASE SEGMENTS INSTALLED IN SERVER | BEFORE INSTALLATION: SERVER PRIMARY RESPONSIBILITY DATA SEGMENTS | AFTER INSTALLATION: SERVER PRIMARY RESPONSIBILITY DATA SEGMENTS | ALLOCATED PRIMARY QUERY RESPONSE TIME (MILLISECONDS) | DESIRED REDUNDANCY LEVEL | BEFORE INSTALLATION: SERVER SECONDARY RESPONSIBILITY DATA SEGMENTS | AFTER INSTALLATION: SERVER SECONDARY RESPONSIBILITY DATA SEGMENTS | SECONDARY QUERY INITIATION TIME (MILLISECONDS) |
|---|---|---|---|---|---|---|---|---|
| 208 | 1 - 50 | 1 - 8 | 1 - 6 | 100 | SINGLE | 44 - 50 | 42 - 50 | 101 |
| 210 | 1 - 50 | 9 - 17 | 7 - 13 | 100 | SINGLE | 1 - 8 | 1 - 6 | 101 |
| 212 | 1 - 50 | 18 - 26 | 14 - 20 | 100 | SINGLE | 9 - 17 | 7 - 13 | 101 |
| NEW | 1 - 50 | N/A | 21 - 27 | 100 | SINGLE | N/A | 14 - 20 | 101 |
| 214 | 1 - 50 | 27 - 36 | 28 - 34 | 100 | SINGLE | 18 - 26 | 21 - 27 | 101 |
| 216 | 1 - 50 | 37 - 43 | 35 - 41 | 100 | SINGLE | 27 - 36 | 28 - 34 | 101 |
| 218 | 1 - 50 | 44 - 50 | 42 - 50 | 100 | SINGLE | 37 - 43 | 35 - 41 | 101 |
| 510 | 520 | 530 | 540 | 550 | 560 | 570 | 580 | 590 |

SYSTEMS AND METHODS FOR SERVER MANAGEMENT

CROSS-REFERENCE TO RELATED APPLICATIONS

This application is a continuation and claims the priority benefit of U.S. patent application Ser. No. 11/355,327 filed Feb. 15, 2006 and entitled "Systems and Methods for Server Management." The disclosure of this commonly owned application is incorporated herein by reference.

BACKGROUND OF THE INVENTION

1. Field of the Invention

The present invention relates generally to computer networks, and more particularly to network server balancing and redundancy.

2. Description of Related Art

FIG. 1 shows a simplified architecture 100 for a prior art approach to network server management. Three servers are illustrated: server 110 containing a first segment of a database; server 120 containing a second segment of the database; and server 130 containing a third segment of the same database. Also illustrated in FIG. 1 is communications network 140 responsible for transferring information between users 150 through 170 and one of the three servers responsible for responding to a particular query.

The prior art approach to server management illustrated in FIG. 1 suffers from several drawbacks.

First, the entire database in FIG. 1 is divided between three separate servers. No single server contains the entire database nor do segments of the database overlap amongst the servers. For example, in the case of a phone book database, server A (110) may comprise entries A thru H, server B (120) may comprise entries I through Q and server C (130) may comprise entries R-Z. Accordingly, in the event one of the three servers illustrated in FIG. 1 experiences a delay or failure, the other servers in the network are unable to respond on behalf of the failed server, because they lack the requisite data. As a result, certain responses to queries may be delayed or go unprocessed.

Second, even if all of the servers in the illustrated network of FIG. 1 stored the requisite data and received all queries, there is no mechanism for one server to monitor whether another server with responsibility for processing a query is actually processing the query. As a result, one server may have available processing capability going unutilized as that server is under the misconception that another server is processing the request.

Third, the prior art architecture illustrated in FIG. 1 is not scalable. Server limitations (e.g. processor speed or storage capacity) dictate the number of queries a server can process. Installation of additional servers to store additional information and process additional queries often requires shutting down an entire network. Additional downtime is often imposed by rearranging data on existing servers. Consequently, as evidenced by the prior art architecture illustrated in FIG. 1, there is a need for improved systems and methods of server management.

SUMMARY OF THE INVENTION

The present invention provides exemplary systems and methods for server management. An exemplary system comprises a plurality of servers, each server having the ability to access a database. An exemplary communications network allows for queries to be received by all servers in the network, while a look-up table identifies the servers in the network responsible for processing particular queries. Further embodiments of the system feature a program logic controller for tracking and rebalancing the workload of the network servers.

An exemplary method of server management comprises installing a copy of a database (or portion thereof) on each network server, receiving all queries at all servers, and processing queries as directed by a look-up table.

An exemplary method of query processing comprises submitting a query to a network, sending the query to every server in the network and each server looking-up on a look-up table the server in the network having primary responsibility for processing the particular query. Monitoring of the processing of queries in the network is performed by all network servers. A query result may be transmitted to the user thereby completing the process.

An exemplary method of rebalancing server load includes determining an overall query response rate for a network, comparing the overall query response rate for the network to a target overall query response rate, determining a query response rate for each server in the network, and comparing the query response rates for all of the servers in the network. Based on this method, the primary responsibility for one or more data segments can be transferred from one server in the network having a relatively slow query response rate to a server in the network having a relatively fast query response rate. This method can be performed either manually or with the support of an optional program logic controller. In the event server load is not rebalanced, further embodiments of the present invention include methods for introducing an additional server to the network.

Exemplary methods of introducing an additional server to the network include installing a copy of the database (or portions thereof) used on the existing servers in the network on the additional server, configuring the additional server to receive all queries and installing a look-up table that either resides on or is accessible by the additional server to the network. Further embodiments include configuring the additional server to monitor the processing of queries in the network.

BRIEF DESCRIPTION OF THE DRAWINGS

FIG. 3 is an exemplary look-up table according to one embodiment of the present invention;

FIG. 5 is an exemplary look-up table according to an exemplary scenario of server load rebalancing by the addition of a server to the network;

DETAILED DESCRIPTION

Figure 1:
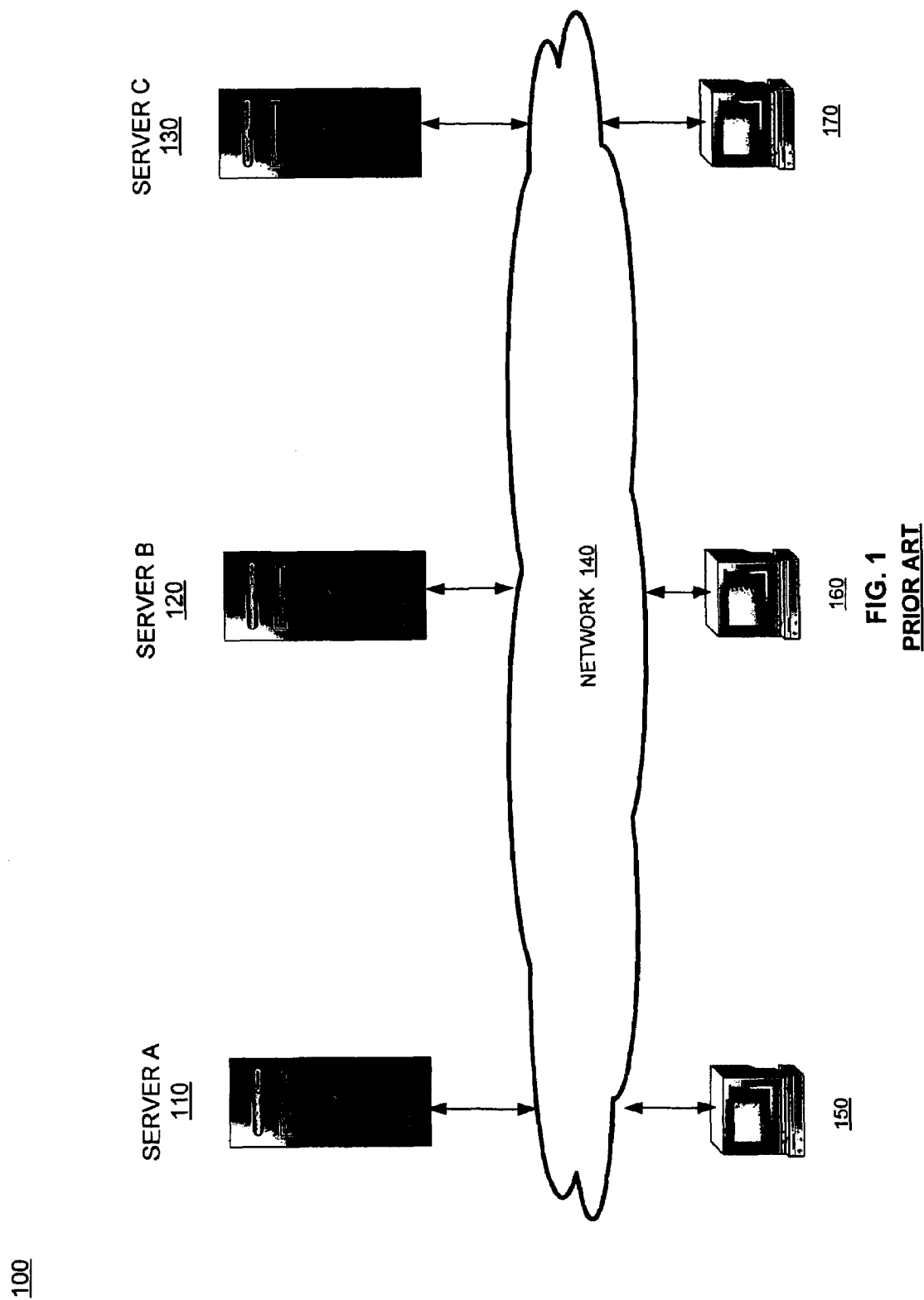
FIG. 1 is a simplified architecture of a prior art, non-scalable, non-redundant and failure-prone approach to network server management.
Figure 2:
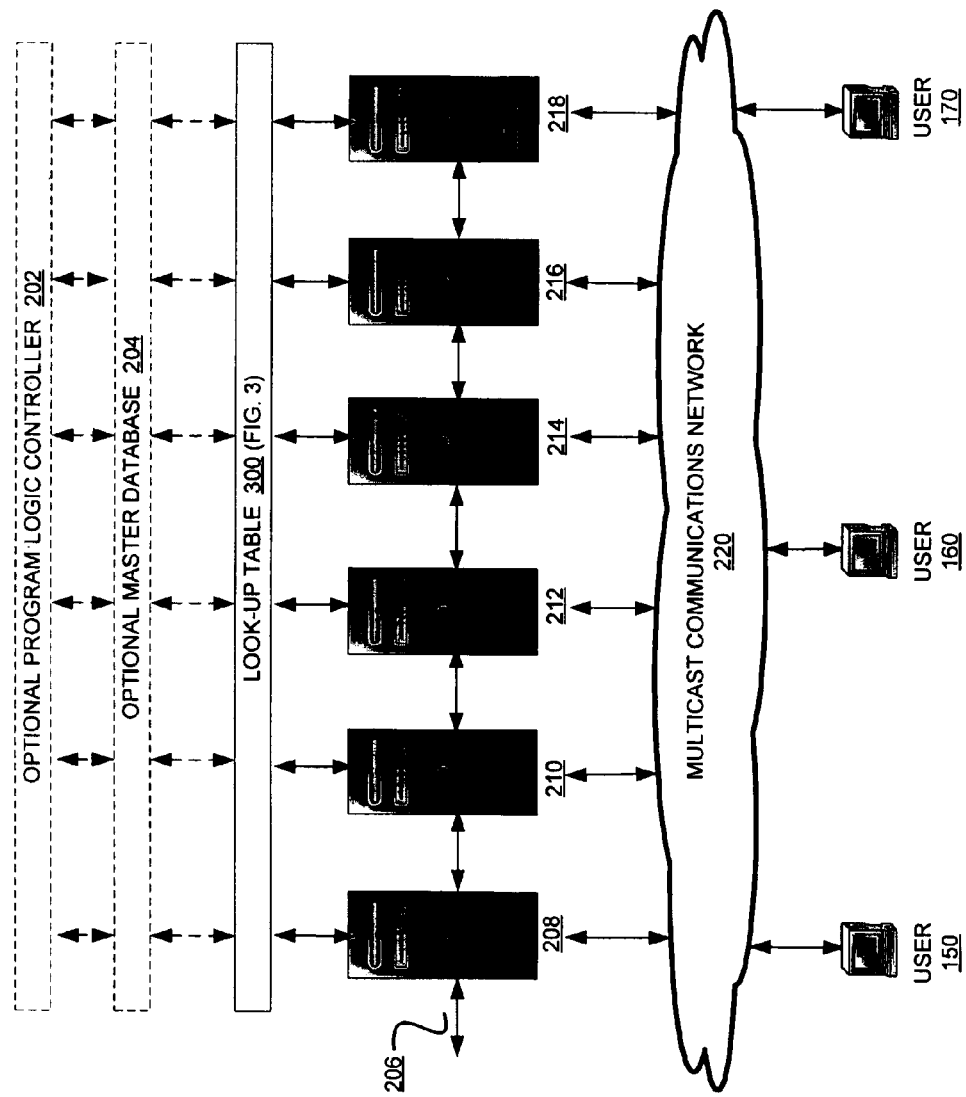
FIG. 2 is an exemplary network architecture in which a scalable, redundant and reliable server network may be implemented.

Referring to FIG. 2, an exemplary network architecture 200 is illustrated in which various embodiments of the invention may be implemented. The exemplary network architecture 200 includes an optional program logic controller 202, an optional master database 204 and a look-up table 300 (FIG. 3). Optional communications linkage 206, servers 208 through 218, and communications network 220 also comprise the exemplary network architecture shown in FIG. 2. In some embodiments of the present invention, servers 208 through 218 each contain one or more clocks and/or other timing devices that are maintained in synchrony with one another and/or based upon each clock or other timing device periodically referencing a shared standard through communications network 220, such as an atomic clock. Ultimately, some sort of a timing means (e.g., clock, timer, etc.) is necessary—as will be explained in detail herein—to ensure that a query has been timely handled by a primary server before the query is passed to a secondary server for handling (e.g., response).

Certain timing devices may be better suited to particular configurations than others (although they are not necessarily prevented from being implemented in those configurations). For example, a clock may be best suited for a shared query resource (as described below) whereas a simple timer may be best suited for responding to individual queries delivered to the exemplary network architecture 200.

In FIG. 2, queries are generated by users 150 through 170 and communicated over communications network 220 to servers 208 through 218. In one exemplary embodiment, communications network 220 uses multicast or broadcast techniques to communicate queries to the servers. In this exemplary embodiment, all servers receive all queries. Among other things, a query may comprise a request for the calculation, computation or determination of a particular value, values or other information. Queries may also comprise a request for a return of information, which may further comprise the aforementioned values or other information. In alternative embodiments, other wired and/or wireless mechanisms communicate all queries to all servers. In yet further embodiments, queries and/or notice of queries are communicated to a subset of servers comprising the network, wherein the servers that are not responsible for processing or backing up a particular query do not receive the query. In still further embodiments of the present invention, queries may be held in a shared resource, that resource comprising a list of outstanding queries, which can be monitored and/or accessed by the aforementioned network of servers. This shared resource may be an intermediate server, some sort of queuing mechanism (e.g., a router), a memory buffer or other means for maintaining a list of queries or the actual queries themselves.

Communications network 220 allows each server in the exemplary network architecture 200 to monitor query processing by the other servers in the network. For example, a reply to a query may be broadcast or multicast over the network 200. In alternative embodiments, other forms of server peer monitoring are used, such as optional communications linkage 206. In still further embodiments, a subset of servers comprising the network are monitored by peer servers, wherein the servers that are not responsible for processing a particular query are not monitored.

In an exemplary embodiment, servers 208 through 218 each contain an entire database or database copy. The contents of each database or database copy can be substantially the same or may have certain segments of data omitted. Alternative exemplary embodiments of the present invention include an optional master database 204, which can be accessed by all of the servers in the network. Optional database 204 may be in lieu of or in addition to the entire database or database copy installed on each server. In the exemplary network architecture 200, an entire database or database copy contains the information queried by users 150 through 170. Database examples include telephone directories, customer databases or catalogs of products and/or services. Categories of other database content are within the scope of the present invention. In other embodiments of the present invention, servers 208 through 218 may be configured to process and/or respond to the aforementioned queries (e.g., be programmed with the necessary logic to respond to a particular calculation request). This configuration may be in addition to or in place of the aforementioned database or database copy.

Each database or database copy comprises one or more segments of data or data segments. In some exemplary embodiments, segments of data are determined based on the nature of the underlying data. For example, the twenty-six letters of the English alphabet may represent twenty-six segments of data forming a telephone directory database. Twenty-six servers may each be assigned a primary responsibility for processing queries corresponding to a particular letter of the alphabet. For example, one server is assigned the primary responsibility for processing queries corresponding to last names beginning with the letter "A," while a second server is assigned the primary responsibility for processing queries corresponding to last names beginning with the letter "B." Likewise, a third server is assigned primary responsibility for processing queries corresponding to last names beginning with the letter "C," and so on.

In alternate embodiments, responsibilities for each server in a network may be determined based upon an arbitrary designation of data segments. For example, in some embodiments, a database may be segmented into as many equally-sized megabytes of data as there are servers forming the network. Various formulas may also be used to weight segment determinations based on averaging or estimating query frequency for a particular segment of the data or certain processing requirements related thereto.

In an exemplary embodiment, segments of data in the database are manually or automatically cataloged by look-up table 300 (FIG. 3). In an alternative embodiment, an optional program logic controller 202 may divide a database into optimized segments of data that are automatically updated and reflected in look-up table 300. In an exemplary embodiment of the server network, program logic controller 202 monitors, balances and/or rebalances server load, based on factors such as changes in server usage, server storage capacity and/or query frequency.

Turning to FIG. 3, exemplary look-up table 300 is shown. In accordance with some embodiments of the invention, a look-up table such as look-up table 300 directs query processing by network servers. The presence of columns and headers in look-up table 300 is for illustrative purposes and not meant to impose any particular data structure or format.

In look-up table 300, servers 208 through 218 (FIG. 2) are identified in column 310. In some embodiments of the present invention, each of these servers contains a copy of look-up table 300. In alternative embodiments, the servers can access a centralized look-up table.

Look-up table 300, in column 320, identifies the data segments installed in each of the servers. In the illustrated network architecture of FIG. 2, look-up table 300 reflects that an entire database comprising data segments 1-6 is installed in servers 208 through 218.

In exemplary embodiments, each server in a network is assigned one or more unique data segments. Collectively, each unique data segment assigned to each of the servers on the network comprises the entire database. The unique portion of the database or data segments represent that particular server's responsibility for processing when a query for information located in the server's unique data segment or segments is communicated to all of the servers on the network. In response to a query transmitted to all of the servers on the network, the particular server responsible for the data segment(s) containing the requested information will be allocated a certain amount of time to process the query while the other servers monitor the processing. Accordingly, the server first responsible for processing a query is deemed to have primary responsibility for processing queries for information located in the server's unique data segment(s).

The primary responsibilities for each server in the network are identified in column 330 of look-up table 300. As shown in FIG. 3, server 208 is assigned primary responsibility for data segment 1; server 210 is assigned primary responsibility for data segment 2; server 212 is assigned primary responsibility for data segment 3; server 214 is assigned primary responsibility for data segment 4; server 216 is assigned primary responsibility for data segment 5; and server 218 is assigned primary responsibility for data segment 6.

In look-up table 300, each server is allocated 100 milliseconds in which to complete its assigned primary responsibility (e.g. responding to a query) as shown in column 340. Exemplary look-up table 300 also includes an assigned time for secondary query initiation as reflected in column 370. In the event a particular server assigned primary responsibility cannot process or respond to a particular query in its allocated time, a server having secondary responsibility is assigned a particular time to initiate the query. For example, should server 208 fail to respond within 100 milliseconds to a query of data segment 1 (for which server 208 has been assigned primary responsibility), server 210 will initiate processing of the same query following the expiration of server 208's allocated primary response time (e.g. at 101 milliseconds as reflected in column 360). In some embodiments of the present invention, the assignment of a second query initiation time (col. 370) may not be necessary whereby a second server simply takes on processing responsibilities with the expiration of the allocated primary query response time (column 340) if there has not been a response to the query.

In look-up table 300, server 208 is assigned secondary responsibility for data segment 6; server 210 is assigned secondary responsibility for data segment 1; server 212 is assigned secondary responsibility for data segment 2; server 214 is assigned secondary responsibility for data segment 3; server 216 is assigned secondary responsibility for data segment 4; and server 218 is assigned secondary responsibility for data segment 5 as reflected in column 360. In exemplary embodiments, secondary responsibility for querying a particular segment of data is not assigned to the same server having primary responsibility for the same segment of data, in order to enhance network reliability in the event of a server delay or failure. That is, the delay or failure of one server should not adversely impair the ability of a second server to step-in and respond to a particular query.

Look-up table 300 indicates the exemplary server network is operating with double redundancy as reflected in column 350. If the desired redundancy level indicates the server network is operating with double redundancy, a third server with tertiary responsibility will attempt to process any query missed by the respective primary and secondary servers.

As illustrated by the exemplary look-up table 300, tertiary responsibilities and respective query initiation times are assigned to server networks operating with double redundancy. In an exemplary embodiment, tertiary responsibility for querying a particular segment of data is not assigned to the same server having secondary responsibility for the same segment of data. Double redundancy enhances network reliability and performance in the event two servers experience a failure, because a third server can 'step-in' and process a query for a segment of data for which it has tertiary responsibility.

According to some exemplary embodiments of the present invention, such as illustrated by exemplary network architecture 200, the presence of optional master database 204 in addition to the database or database copy stored on each of servers 208 through 218 provides an additional fail-safe mechanism that can be accessed in the event each server with an assigned responsibility (i.e. primary, secondary, tertiary or so on) for a particular query should fail to process its assigned responsibility within the allocated time. Provided the server containing optional master database 204 remains functional, no query should go unprocessed in such a network, because the server containing optional master database 204 will step-in and process the query or, alternatively, may be accessed by another capable server in the network to obtain, process and deliver the necessary data.

Figure 4:
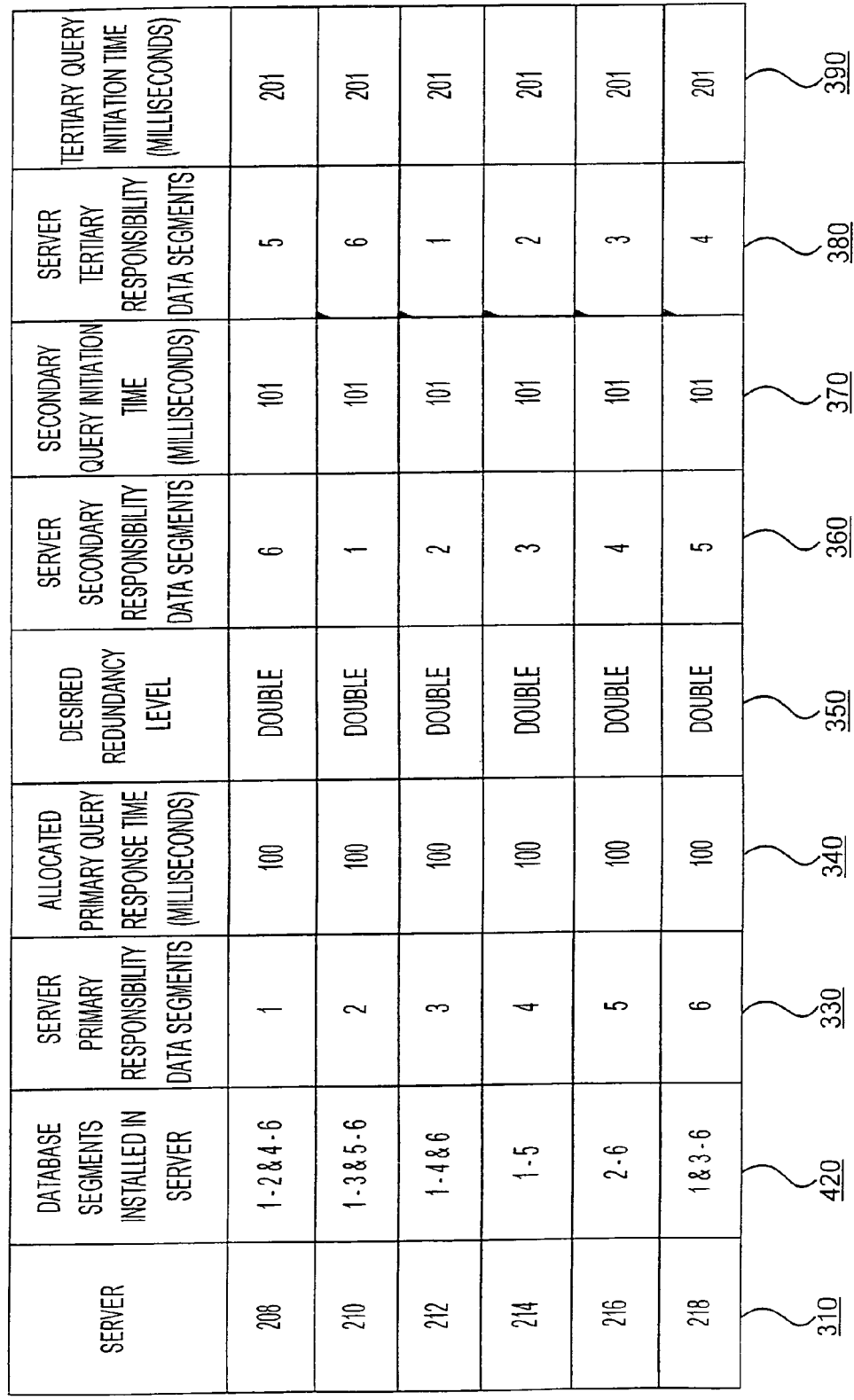
FIG. 4 is an exemplary look-up table according to an exemplary scenario of server load balancing.

Turning to FIG. 4, an exemplary look-up table according to an exemplary scenario of server load balancing is shown. Query response times, server usage, volume of stored data and query frequency are just a few of the reasons necessitating the balancing and/or rebalancing of server responsibilities and/or stored databases. An optional program logic controller 202 (FIG. 2) can be used to monitor query response times, server usage, volume of stored data and/or query frequency and automatically rebalance a server network. In some embodiments, these adjustments are made manually. In either case, increased query response times are typically the first indication that a server network might be in need of rebalancing. One way of balancing and/or rebalancing a server network is illustrated by exemplary look-table 400. In exemplary look-up table 400, extra server storage capacity is created by the selective installation of data segments that comprise each server's database.

The categories of information contained in look-up table 400 are similar to the categories of information contained in exemplary look-up table 300 (FIG. 3), with the exception that column 420 reflects that each server in the network does not contain an entire copy of the database. Unlike the illustrative network reflected in exemplary look-up table 300, segments of data are omitted from the data segments installed in the servers shown in column 420.

As illustrated in column 420 of exemplary look-up table 400, data segments 1-2 and 4-6 are installed in server 208. Data segment 3 is omitted from the database in server 208. Server 208 is assigned primary responsibility for data segment 1 as shown in column 330. Server 208 is also assigned secondary responsibility for data segment 6 (column 360), and assigned tertiary responsibility for data segment 5 (column 380).

Additionally, as illustrated in column 420, data segments 1-3 and 5-6 are installed in server 210; data segments 1-4 and 6 are installed in server 212; data segments 1-5 are installed in server 214; data segments 2-6 are installed in server 216; and data segments 1 and 3-6 are installed in server 218.

The exemplary scenario of server load balancing and/or rebalancing illustrated in exemplary look-up table 400 can be applied to the exemplary network shown in FIG. 2 and FIG. 3, resulting in a savings of six data segments or the equivalent of the storage capacity of one server. As shown in column 350 of FIG. 4, the exemplary scenario of server load balancing and/or rebalancing retains the double redundancy level of the network. The extra server storage capacity can be used to store data segments transferred from servers experiencing a slow response time, as will be described in connection with FIG. 7 herein.

Turning to FIG. 5, an exemplary look-up table 500 whereby server load is rebalanced by the addition of a server to a network is shown. The categories of information contained in look-up table 500 are similar to the categories of information contained in exemplary look-up table 300 (FIG. 3), with the exception that before server installation (columns 530 & 570) and after server installation (columns 540 & 580) comparisons are shown.

As shown in FIG. 5, the database installed on each server remains the same throughout the installation process while the number of network servers and their responsibilities (i.e. primary, secondary and/or tertiary and so on) are changed. In column 520 of exemplary look-up table 500, servers 208 through 218 each contain a database comprising data segments 1-50. Data segments 1-50 have been installed in the additional server (titled "NEW") prior to initiating server installation. Because each server contains a database comprising the same data segments, the network can continue operating while server NEW is added to the network. That is, the continuous operating of the network is not dependent on any one server. When server NEW is brought online, the before server installation settings (columns 530 & 570) are replaced by the after server installation settings (columns 540 & 580), and the network continues to operate uninterrupted.

As an example of server load rebalancing by the installation of an additional server, assume in exemplary look-up table 500, before the installation of server NEW, server 208, server 210, server 212, and server 214 are each processing queries at an unacceptably slow rate. Also assume that server 216 is processing queries at an acceptable rate, and server 218 is processing queries at a maximum rate. As shown in column 560, the network is operating at a single rate of redundancy or redundancy level.

Server load rebalancing based on the exemplary method described in connection with FIG. 8 herein will result in server 208 transferring primary responsibility for data segments 7-8 (column 530) to server 210 (column 540), server 210 transferring primary responsibility for data segments 14-17 (column 530) to server 212 (column 540), and server 212 transferring primary responsibility for data segments 21-26 (column 530) to server NEW (column 540). Likewise, server load rebalancing results in server 214 transferring primary responsibility for data segment 27 (column 530) to server NEW (column 540) and transferring primary responsibility for data segments 35-36 (column 530) to server 216 (column 540). Finally, server 216 transfers primary responsibility for data segments 42-43 (column 530) to server 218 (column 540).

As evidenced by comparing the number of data segments for each network server before installation (column 530) to after installation (column 540), primary responsibility for server 208 decreases by two data segments; primary responsibility for server 210 decreases by two data segments; primary responsibility for server 212 decreases by two data segments and primary responsibility for server 214 decreases by three data segments. In total, the workload of these four servers decreases by nine data segments. After the installation of server NEW, primary responsibility for server 216 remains unchanged and primary responsibility for server 218 increases by two data segments. Finally, primary responsibility for server NEW is initiated with seven data segments (column 540). As shown in column 560, the network remains operating at a single rate of redundancy.

Figure 6:
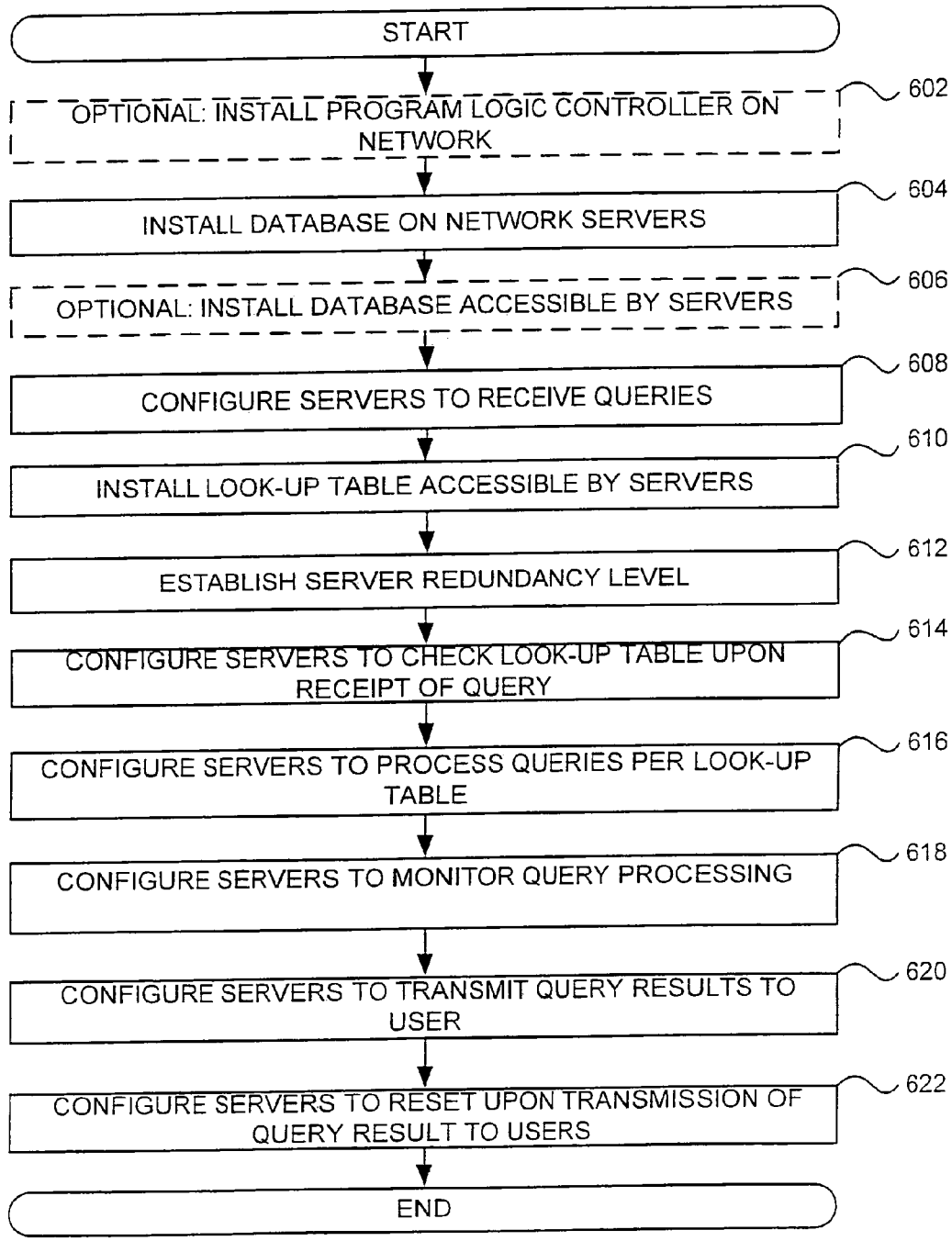
FIG. 6 is a flowchart for one exemplary method of establishing a scalable, redundant and reliable server network according to various embodiments of the invention.

Turning to FIG. 6, an exemplary flowchart for one method of establishing a scalable, redundant and fault-tolerant server network according to an exemplary embodiment of the present invention is shown.

At step 602, an optional program logic controller 202 (FIG. 2) is installed as part of the exemplary network architecture 200 (FIG. 2). In an exemplary embodiment of the server network, program logic controller 202 monitors and rebalances server load, based in part on changes in server usage, server storage and query frequency. Optional program logic controller 202 reduces the need for network manual server maintenance and associated equipment upgrades and purchases, through automating, for example, the aforementioned functions.

At step 604, a database is installed on each server in the exemplary network architecture 200. The contents of each installed database or installed database copy can be substantially the same or may have certain segments of data omitted. Database examples include but are not limited to telephone directories, customer databases or catalogs of products and/or services.

At step 606, an optional master database 204 (FIG. 2) is installed in the server network. Optional master database 204 may be accessed by all of the servers in the network should such access ever prove to be necessary.

At step 608, network servers in the exemplary network architecture 200 are configured to receive all queries. In exemplary embodiments, communications network 220 uses multicasting or broadcasting to communicate all queries to all servers. In these embodiments, all servers receive all queries. In alternative embodiments, other wired and/or wireless mechanisms communicate all queries to all servers. In yet further embodiments, queries and/or notice of queries are communicated to a subset of servers comprising the network, wherein the servers that are not responsible for processing a particular query do not receive the query.

At step 610, a look-up table 300 (FIG. 3) is installed for each of servers 208 through 218 (FIG. 2) that comprise the exemplary network architecture 200. In exemplary embodiments, look-up table 300 directs server query processing. Look-up-table 300 may be local or remote relative to the server 208 through 218.

At step 612, a server redundancy level may be established for exemplary network architecture 200. Server redundancy level is a function of the tolerance for server network failure. The lesser the tolerance for server network failure, the higher the server redundancy level. For example, users that can tolerate an occasional network failure might establish a single redundancy level as shown in FIG. 5, whereas users that can not tolerate an occasional network failure might establish a double redundancy level as shown in FIG. 4. As illustrated by exemplary look-up table 300, a single redundancy level signifies that if a server assigned primary responsibility fails to process an assigned query within an allocated period of time, another server with secondary responsibility for the same segment of data will attempt to process the query. A double redundancy level signifies that a third server assigned tertiary responsibility will attempt to process any query missed by the servers assigned primary and secondary responsibilities. Assuming the installation of an entire database on each network server as illustrated in FIG. 2, FIG. 3, and FIG. 5, the redundancy level of a server network is limited only by the number of servers (e.g. servers 208 through 218) on the network.

At step 614, servers comprising the exemplary network architecture 200 are configured upon receipt of each query to check the look-up table installed at step 610. In exemplary embodiments, look-up table 300 identifies the data segments installed in each server.

At step 616, servers comprising the exemplary network architecture 200 are configured to process queries per look-up table 300. Look-up table 300, in the present example, allocates each server 100 milliseconds in which to complete its assigned primary responsibility.

At step 618, servers comprising the exemplary network architecture 200 are configured to monitor query processing by the other servers in the network. In exemplary embodiments, communications network 220 allows each server in the exemplary network architecture 200 to monitor query processing by the other servers in the network by 'listening,' for example, for a broadcast or multicast reply to the query. In alternative embodiments, other forms of server peer monitoring are used, such as optional communications linkage 206. In yet further embodiments, a subset of servers comprising the network are monitored by peer servers, wherein the servers that are not to be responsible for processing a particular query are not monitored.

At step 620, servers comprising the exemplary network architecture 200 are configured to transmit query results to users.

At step 622, servers comprising the exemplary network architecture 200 are configured to reset upon transmission of a query result to a user. That is, present response time is reset to zero.

Figure 7:
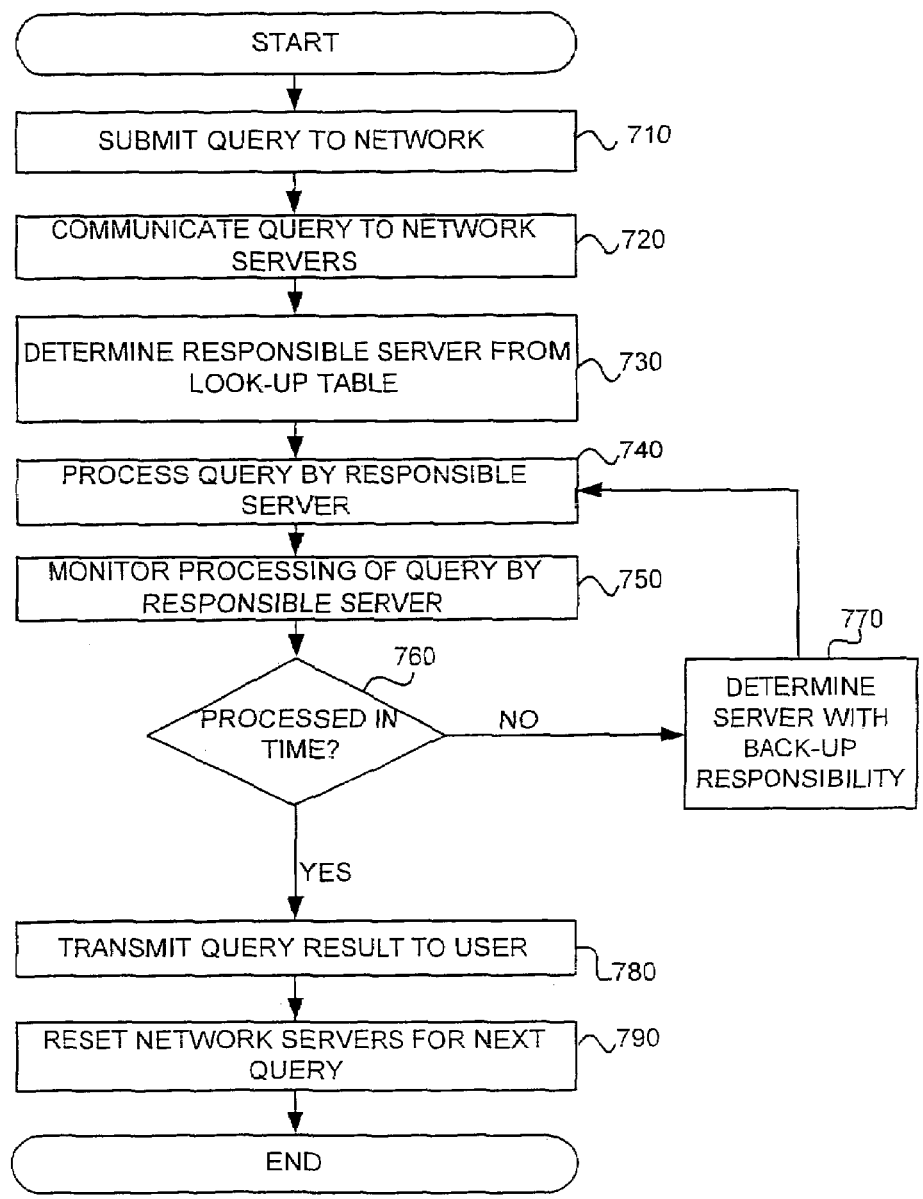
FIG. 7 is a flowchart for one exemplary method of processing a query on a scalable, redundant and reliable server network according to various embodiments of the invention.

Turning to FIG. 7, a flowchart for an exemplary method of processing a query on the exemplary network architecture 200 (FIG. 2) is shown.

At step 710, a query is submitted to exemplary network architecture 200. In the case of a server network for a telephone directory database, user 150 (FIG. 2) submits a query for an address corresponding to a person having the last name of Jones.

At step 720, the submitted query is communicated to network servers. Here, the query for an address corresponding to a person having the last name of Jones is multicast through communications network 220 (FIG. 2) to all servers in the exemplary network architecture 200.

At step 730, the identity of the server having primary responsibility for processing the submitted query is determined based upon referencing a look-up table. Here, the look-up table for the queried telephone directory database reflects that the tenth server of twenty-six servers (each corresponding to a letter of the alphabet) is assigned primary responsibility for processing queries corresponding to last names beginning with the letter "J." Therefore, server ten has the primary responsibility of querying its data segment for the address of Jones.

At step 740, the submitted query is processed (or attempted to be processed) by the responsible server. In this particular case, server ten processes the query for the address corresponding to Jones.

At step 750, the processing of the submitted query by the server having primary responsibility is monitored by the other servers in the network. In exemplary embodiments, communications network 220 allows each server in the exemplary network architecture 200 to monitor query processing by the other servers in the network through, for example, listening for a multicast or broadcast reply to the query. In alternative embodiments, other forms of server peer monitoring are used, such as through optional communications linkage 206. In yet further embodiments, a subset of servers comprising the network are monitored by peer servers, wherein the servers that are not to be responsible for processing a particular query are not monitored. In this particular example, twenty-five of the twenty-six servers comprising the server network for the telephone directory database monitor the processing by server ten for the address corresponding to Jones.

At step 760, it is determined whether the submitted query has been processed within the allocated time. Referring to look-up table 300 (FIG. 3), each server is allocated 100 milliseconds in which to complete its assigned primary responsibility. In this particular example, server ten determined within 100 milliseconds that the address corresponding to Jones is 2200 Geng Road, Palo Alto, Calif.

At step 770, should the query not be processed within the allocated time by the server having primary responsibility for the query (e.g. due to server delay or server failure), a server with secondary responsibility is determined based on the method described in connection with step 730. The server with secondary responsibility then processes the query as set forth in steps 740-750. Other backup and/or secondary servers continue to await an indication the query has been timely processed in step 760.

At step 780, the query result is transmitted to the user who submitted the query via, for example, a multicast or broadcast methodology. In this particular example, user 150 (FIG. 2) will receive the address for Jones via a multicast transmission over communications network 220.

At step 790, network servers reset for the next query. In this particular example, the twenty-six servers comprising the telephone directory database will reset their present processing time to zero in anticipation of the next query to be submitted by a user. That is, the network servers await the arrival of a new query wherein overall processing time with regard to a particular query begins relative that particular query and its own timestamp (i.e., the overall time since the query was made or was received by the network servers).

Figure 8:
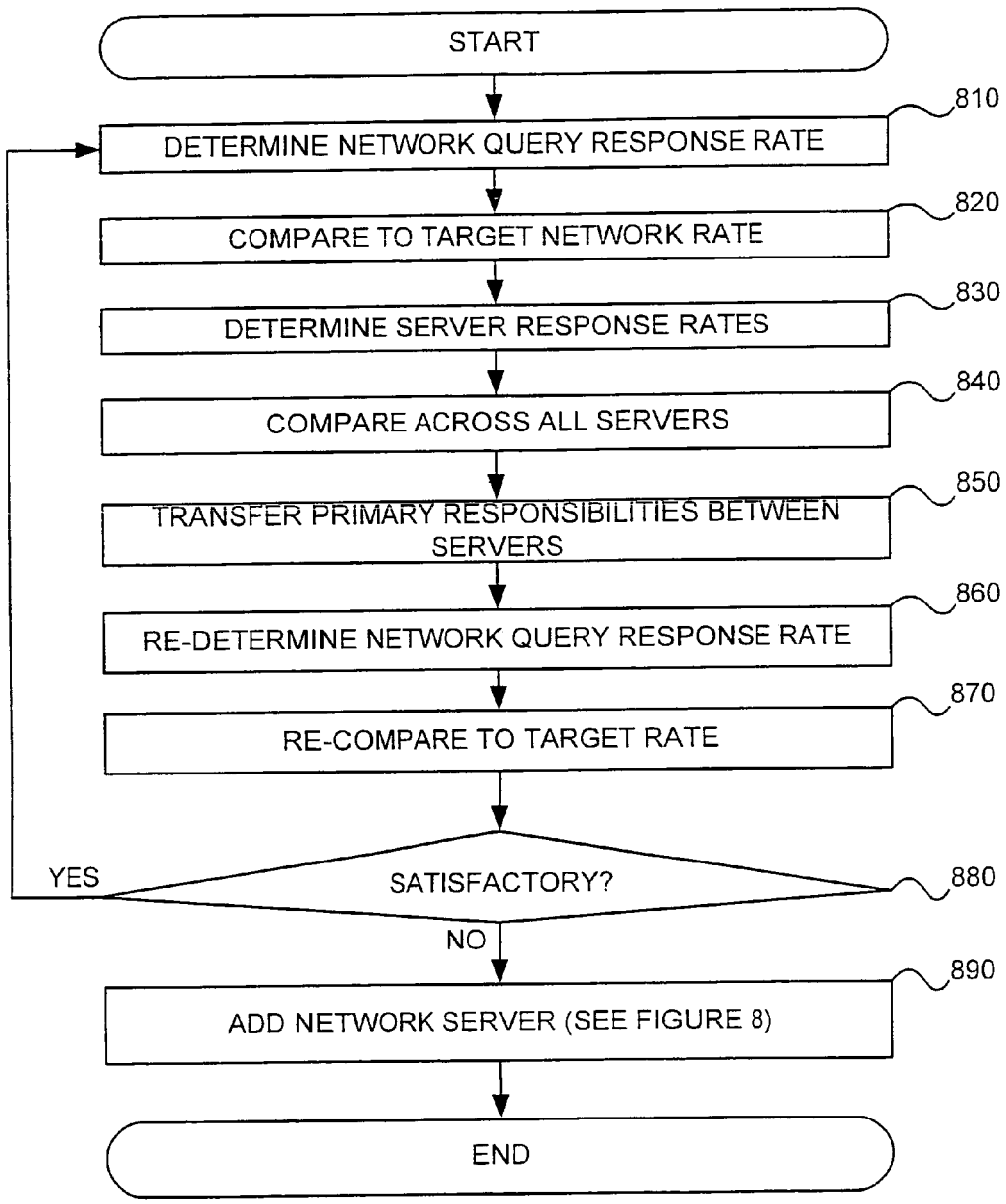
FIG. 8 is a flowchart for one exemplary method of rebalancing network server load either manually or by the use of a program logic controller according to various embodiments of the invention.

Turning to FIG. 8, a flowchart for one exemplary method of evaluating and rebalancing network server load according to an exemplary embodiment of the invention is shown. All steps in FIG. 8 can be performed either manually or with the assistance of an optional program logic controller 202 (FIG. 2).

At step 810, an overall network query response rate is determined. For example, the average time it takes to process each query submitted to the exemplary network architecture 200 (FIG. 2) can be determined for a twenty-four hour period either manually or by an optional program logic controller 202. Various other time periods or measures of response time may be used.

At step 820, the overall network query response rate as determined by step 810 is compared to a target overall network query response rate. For example, with respect to the telephone directory database described in connection with FIG. 7, the particular telephone company responsible for the telephone directory database might determine, on average, it desires to have all queries processed within 100 milliseconds.

This comparison represents a measure by which the server network can be evaluated apart from the performance of the constituent servers.

At step 830, individual server query response rates are determined. For example, the average time it takes each of servers 208 through 218 in FIG. 2 to process each query submitted in the exemplary network architecture 200 can be determined for a twenty-four hour period either manually or by an optional program logic controller 202 or through various other periods and measures of time.

At step 840, the response rates for all of the servers are compared. For example, in the exemplary embodiment illustrated in FIG. 5 and described herein, the response rates of server 208, server 210, server 212, and server 214 were slower than the response rates of server 216 and server 218, which indicated that servers 208 through 214 warranted a reduction in the number of data segments for which they had primary responsibility.

At step 850, the primary responsibilities for particular data segments are transferred from the servers having slower query response rates to the servers having faster query response rates. For example, as described in connection with FIG. 5, server 208 transferred primary responsibility for data segments 7-8 (two data segments) to server 210, server 210 transferred primary responsibility for data segments 14-17 (four data segments) to server 212.

At step 860, an overall network query response rate is re-determined in the same fashion as described in connection with step 810.

At step 870, the re-determined overall network query response rate as determined at step 860 is re-compared to the target overall network response rate.

At step 880, a decision is made as to whether the performance of the rebalanced server network measures favorably against the target network response rate. If the performance of the rebalanced server network is satisfactory, the overall network query response rate can be periodically re-determined, as described in connection with step 810. If the performance of the rebalanced server network is not satisfactory, then step 890 may need to be undertaken.

At step 890, an additional server is installed in the server network, as described in connection with the exemplary method shown in FIG. 9.

Figure 9:
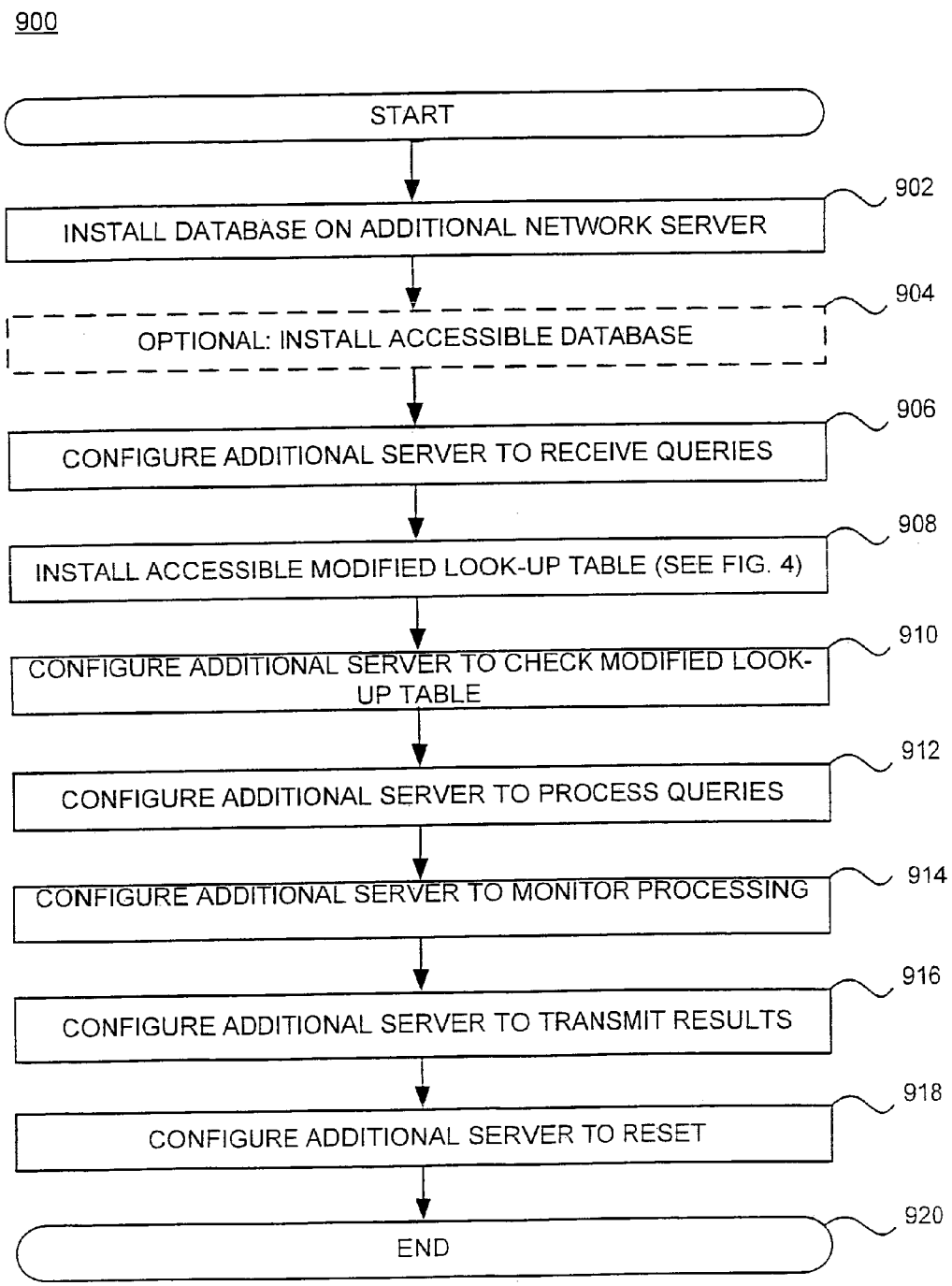
FIG. 9 is a flowchart for one exemplary method of rebalancing network server load by the installation of an additional server according to various embodiments of the invention.

Turning to FIG. 9, a flowchart for an exemplary method of rebalancing network server load by the installation of an additional server is shown.

At step 902, a database or database copy corresponding to the database used in the existing server network is installed on the additional server.

At step 904, an optional master database 204 (FIG. 2), is made accessible to the additional server to the network. This optional master database may have previously been made available to all other servers in the network.

At step 906, the additional server is configured to receive all queries submitted to the server network. In the example shown in FIG. 2, user queries are directed through communications network 220 (FIG. 2) to all servers in the network. In yet further embodiments, queries and/or notice of queries are communicated to a subset of servers comprising the network.

At step 908, a look-up table, such as exemplary look-up table 500 (FIG. 5), is either installed on the additional server or made accessible to the additional server. As shown in column 510 of exemplary look-up table 500, the look-up table reflects the presence of the additional server.

At step 910, the additional server to the server network is configured to check the modified look-up table described in step 908.

At step 912, the additional server to the network is configured to process queries.

At step 914, the additional server to the network is configured to monitor query processing by the other servers in the network.

At step 916, the additional server to the network is configured to transmit query results to the user.

At step 918, the additional server to the network is configured to reset its present response time in preparation for the next query to be submitted over the network.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A system of networked, redundant computing devices the system comprising:
    a plurality of computing devices, wherein each of the plurality of computing devices are:
        configured to execute a task,
        assigned responsibility for at least a portion of the task, and
        coupled to a communications network and receive a query corresponding to the task, the query received by all of the plurality of computing devices;
    a look-up table stored in memory at each of the plurality of computing devices and accessible by each of the plurality of computing devices, the look-up table configured to direct execution of the task by the plurality of computing devices in response to the query based on at least the responsibility for at least the portion of the task assigned to each of the plurality of computing devices; and
    control logic stored in memory at each of the plurality of computing devices and executable to monitor completion of query processing, whereupon a second computing device from the plurality of computing devices attempts to execute the task corresponding to the query as directed by the look-up table and the monitoring process when a first computing device designated by the look-up table from the plurality of computing devices fails to execute the task corresponding to the query within a predetermined time period, and the plurality of computing devices reset for processing of a new query upon successful processing of the query corresponding to the task.

2. The system of networked, redundant computing devices of claim 1, wherein the query is delivered over the communications network through a multicast transmission.

3. The system of networked, redundant computing devices of claim 1, wherein the query is delivered over the communications network through a broadcast transmission.

4. The system of networked, redundant computing devices of claim 1, wherein each of the plurality of computing devices is assigned a primary responsibility for executing the task and each of the plurality of computing devices is assigned a secondary responsibility for executing the task.

5. The system of networked, redundant computing devices of claim 4, further comprising a program logic controller, the program logic controller configured to reassign the primary and secondary responsibilities for execution of the task in response to the query.

6. The system of networked, redundant computing devices of claim 4, wherein the primary responsibility for each of the plurality of computing devices differs from the secondary responsibility for each of the plurality of computing devices.

7. The system of networked, redundant computing devices of claim 1, wherein each of the plurality of computing devices is configured to execute the task.

8. The system of networked, redundant computing devices of claim 7, wherein each of the plurality of computing devices is further configured to execute a different task.

9. The system of networked, redundant computing devices of claim 1, wherein the query is a request for information.

10. The system of networked, redundant computing devices of claim 1, wherein the query is a request for a determination of information.

11. The system of networked, redundant computing devices of claim 1, further comprising an intermediate computing device coupled to the communications network, the intermediate computing device not otherwise configured to execute a task, and wherein the query is delivered to each of the plurality of computing devices by the communications network via the intermediate computing device.

12. The system of networked, redundant computing devices of claim 11, wherein the intermediate computing device is configured to maintain a queue of queries for distribution to the plurality of computing devices.

13. A method for balancing processing responsibilities for a plurality of computing devices, comprising:
    determining an average query response rate for a first computing device from the plurality of computing devices, each of the plurality of computing devices having been assigned responsibility for at least a portion of a task and the first computing device having being assigned primary processing responsibility according to a look-up table stored in memory at each of the plurality of computing devices for at least a portion of a task, and having been coupled to the network to receive a user generated query;
    determining an average query response rate for all other computing devices from the plurality of computing devices;
    comparing the average query response rate for the first computing device against the average query response rate for all other computing devices;
    receiving an active query at all of a plurality of servers in a network;
    monitoring the processing of the active query;
    reallocating processing responsibilities for the plurality of computing devices based on at least the responsibility for at least the portion of the task assigned to each of the plurality of computing devices according to the look-up table when the average query response rate for the first computing device is imbalanced relative the average query response rate for all other computing devices from the plurality of computing devices; and
        resetting the plurality of servers for processing of a new query upon successful processing of the active query.

14. The method for balancing processing responsibilities of claim 13, wherein the reallocation of processing responsibilities is automated.

15. The method for balancing processing responsibilities of claim 14, wherein the automated relocation occurs in response to an instruction from a program logic controller.

16. The method for balancing processing responsibilities of claim 13, wherein the reallocation of processing responsibilities is manual.

17. A computer-readable storage medium having embodied thereon a program, the program being executable by a computer to provide a method for directing execution of a task amongst a plurality of computing devices, the method comprising:
    allocating a primary responsibility for execution of the task to a first computing device according to a look-up table stored in memory at each of the plurality of computing devices;
    allocating a secondary responsibility for execution of the task to a second computing device according to a look-up table stored in memory at each of the plurality of computing devices;
    receiving at all of the plurality of computers a user generated query,
    monitoring the completion of processing of the user generated query;
    allocating a time period for the first computing device with the primary responsibility for executing the task to execute the task upon receipt of the user generated query;
    instructing the second computing device with the secondary responsibility for executing the task to execute the task when the time period for the first computing device with the primary responsibility for executing the task to execute the task has expired without the task having been executed according to the look-up table based on at least the secondary responsibility for execution of the task allocated to each of the second computing device; and
    resetting the plurality of servers for processing of a new user generated query upon successful processing of the user generated query.

18. The computer-readable storage medium of claim 17, wherein the computer-readable medium is installed on each of the plurality of computing devices configured to execute the task.

19. The computer-readable storage medium of claim 17, wherein the computer-readable medium is installed on a master computing device not otherwise configured to execute the task, the master computing device configured to be accessed by each of the plurality of computing devices configured to execute the task.

20. A method for introducing a new computing device to a redundant-network of computing devices, comprising:
    installing a database on the new computing device, wherein the database is identical to a database installed on each of already existing computing devices in the redundant-network of computing devices, each of the already existing computing devices having been assigned responsibility for at least a portion of the database;
    configuring the new computing device to receive all queries submitted to the redundant-network of computing devices;
    allocating a primary and secondary processing responsibility to the new computing device via a look-up table, the look-up table further assigning primary and secondary processing responsibility to each of the already existing computing devices in the redundant-network of computing devices;
    receiving an active query at all of the plurality of computing devices,
    monitoring the completion of processing of the active query;
    processing the active query at a computing device from the plurality of computing devices identified by the look-up table as having primary responsibility for processing the query based on at least the responsibility for at least the portion of the database assigned to each of the already existing computing devices; and resetting the plurality of computing devices for processing of a new query upon successful processing of the active query.

21. The method of claim 20, wherein the look-up table is installed on the new computing device.

22. The method of claim 20, wherein the look-up table is installed on at least one of the already-existing computing devices.

23. The method of claim 22, wherein the new computing device accesses the look-up table via a communications link with the at least one of the already-existing computing device where the look-up table is installed.

24. The method of claim 20, wherein the look-up table is installed on a master computing device, and the new computing device is configured to access the master computing device.

* * * * *